United States Patent [19]

Bass et al.

[11] Patent Number: 4,959,641
[45] Date of Patent: Sep. 25, 1990

[54] DISPLAY MEANS FOR STEREOSCOPIC IMAGES

[76] Inventors: Martin L. Bass, 25 Clydeway, Rise Park, Romford, Essex Rm1 4UR, Great Britain; Peter M. Rutherford, 9 Sumatra Road, London NW6 1PS, Great Britain

[21] Appl. No.: 101,925

[22] Filed: Sep. 28, 1987

[30] Foreign Application Priority Data

Sep. 30, 1986 [GB] United Kingdom ............... 8623490

[51] Int. Cl.⁵ .............................................. G09G 3/36
[52] U.S. Cl. ..................................... 340/700; 340/780; 358/3; 358/88; 350/130; 350/131; 40/454; 354/101
[58] Field of Search .................... 340/700, 784; 358/3, 358/88, 82, 92, 253; 350/130, 131; 40/454; 352/117, 118, 239; 353/32; 354/101

[56] References Cited

U.S. PATENT DOCUMENTS

| | | | |
|---|---|---|---|
| 2,833,176 | 5/1958 | Ossoinak | 40/454 |
| 2,883,906 | 4/1959 | Rehorn | 358/88 |
| 4,158,481 | 6/1979 | Hoyar | 350/130 |
| 4,647,966 | 3/1987 | Phillips et al. | 358/92 |
| 4,706,117 | 11/1987 | Schoolman | 358/88 |
| 4,717,949 | 1/1988 | Eichenlaub | 358/88 |
| 4,737,840 | 4/1988 | Morishita | 358/88 |

FOREIGN PATENT DOCUMENTS

| | | | |
|---|---|---|---|
| 0055114 | 5/1979 | Japan | 358/88 |
| 0684787 | 9/1979 | U.S.S.R. | 358/88 |
| 944154 | 7/1982 | U.S.S.R. | |
| 1019668 | 5/1983 | U.S.S.R. | |
| 1317688 | 6/1987 | U.S.S.R. | |
| 1352667 | 11/1987 | U.S.S.R. | |
| 802501 | 10/1958 | United Kingdom | |
| 851404 | 10/1960 | United Kingdom | |
| 1220705 | 1/1971 | United Kingdom | |
| 1273062 | 5/1972 | United Kingdom | |
| 1403783 | 8/1975 | United Kingdom | |
| 1448520 | 9/1976 | United Kingdom | |
| 2129994 | 10/1983 | United Kingdom | |
| 2138615 | 10/1984 | United Kingdom | |
| 2161639 | 1/1986 | United Kingdom | |
| 2170033 | 7/1986 | United Kingdom | |
| 81/01201 | 4/1981 | World Int. Prop. O. | |

OTHER PUBLICATIONS

"Stereotelevideniye", Moscow Energiya; 1979; pp. 17–19; by G. V. Mamchev.
Three-Dimensional Imaging Techniques, 1976, "Takanori Okoshi", pp. 129–130 and 364–392.

*Primary Examiner*—David K. Moore
*Assistant Examiner*—M. Fatahiyar
*Attorney, Agent, or Firm*—Saidman, Sterne, Kessler & Goldstein

[57] ABSTRACT

A stereoscopic display device in which a plurality of independently controllable and discrete light sources are provided in fixed relation to a lenticular screen. The light sources are adapted and arranged for the display of a pair of interlaced images such that the display device produces a three-dimensional image comprising a pair of spaced-apart images having parallax therebetween. A moving stereoscopic display which can be viewed by the naked eye can thus be achieved.

10 Claims, 6 Drawing Sheets

DISPLAY MEANS FOR STEREOSCOPIC IMAGES

BACKGROUND OF THE INVENTION

1. Field of Invention

The present invention relates to stereoscopic display means which enable the formation of at least a pair of images having parallax therebetween.

2. Description of Prior Art

It is known to produce an illusion of depth or of parallax by providing an observer with a pair of separate images taken from points of view a short distance apart and arranging for each image to be viewed from one eye only.

Stereoscopic display means have previously employed simple blinker like shields and/or binocular eyepieces together with paired photographs or display screens to achieve this object.

As an alternative to separate images, overlaid images have been displayed on a single screen. With "anaglyph" systems these images have differing colors and may be separated by suitably colored filters worn over the eyes. Analogous systems have employed polarising filters worn over the eyes.

In a further alternative, a pair of alternating images are displayed on a single screen and the eyes of an observer are alternately occluded in phase with the images, enabling image separation to be achieved.

Holograms and parallax panoramagrams are also known to provide an illusion of static three-dimensionality.

With the exception of holograms and panoramagrams, all of the above systems enable the stereoscopic display of moving images, but require the observer to wear some form of optical assembly such as blinkers, lenses, polarising filters or colored filters over the eyes. While holograms and panoramagrams do not require the use of such optical assemblies they are generally unsuitable for the display of moving images.

SUMMARY OF THE INVENTION

It is an object of the present invention to provide stereoscopic display means which can conveniently provide a moveable image and which can be viewed by the naked eye.

According to the present invention there is provided a stereoscopic display means comprising;
  a display surface,
  a plurality of discrete light sources arranged on the display surface.
  means for independently controlling each light source, and
  one or more light modifying elements disposed in fixed relation to the surface so as to enable the formation of a three dimensional image.

By arranging the light sources so as to produce at least a pair of movable interlaced images, and employing one or more light modifying elements fixed relative to the surface to separate the pair of interlaced images into a pair of spaced apart images, it is possible to produce a moving stereoscopic display which can be viewed by the naked eye.

Typically, the light sources comprise illuminated liquid crystal elements, visible light emitting diodes, gas plasma elements or discrete phosphor-coated regions of the surface. Other alternatives are possible.

Preferably, the light sources are hard wired by suitable conductors to a switching unit and power supply.

The light modifying elements are preferably provided by a light-transmissive lenticular screen having a plurality of cylindrical lenses disposed in a parallel configuration and having a common focal length. It is also possible to use a screen comprising fly's eye lenses, a screen comprising glass rods and screens comprising glass balls. The individual lenses, rods or balls are referred to as "lenticles" hereafter.

More preferably, one set of light sources is disposed in the focal plane of each lenticle. Each set comprises at least two light sources. The light sources of each set are spaced apart such that the respective images are also spaced apart. Most preferably, the lenticles are of the cylindrical or rod form and each set of light sources comprise a pair, the members of each pair being spaced apart transverse of the longitudinal axis of the lenticle. In use, one light source of the pair displays a picture element which belongs to one of the interlaced images while the other light source of the pair displays a picture element which belongs to the other interlaced image.

Any number of light sources per set may be disposed in the focal plane of each lenticle, to provide a panoramic view which varies as the position of the observer varies. Each set should however consist of at least two light sources.

As an alternative to lenticles it is envisaged that a multi-slot mask or a photographic equivalent may constitute an effective light modifying element.

The interlaced images may be generated in several ways. For example, each image may be generated independently and sequentially or both images may be generated simultaneously. In an embodiment of the invention picture elements or pixels of each of the interlaced images are alternately generated. The images may be derived from a pair of spaced apart cameras or generated by a computational device.

BRIEF DESCRIPTION OF THE DRAWINGS

In order that the present invention may be further set forth it will be described by way of example only and with reference to the accompanying drawings, in which.

DESCRIPTION OF THE PREFERRED EMBODIMENTS

Figure 1:
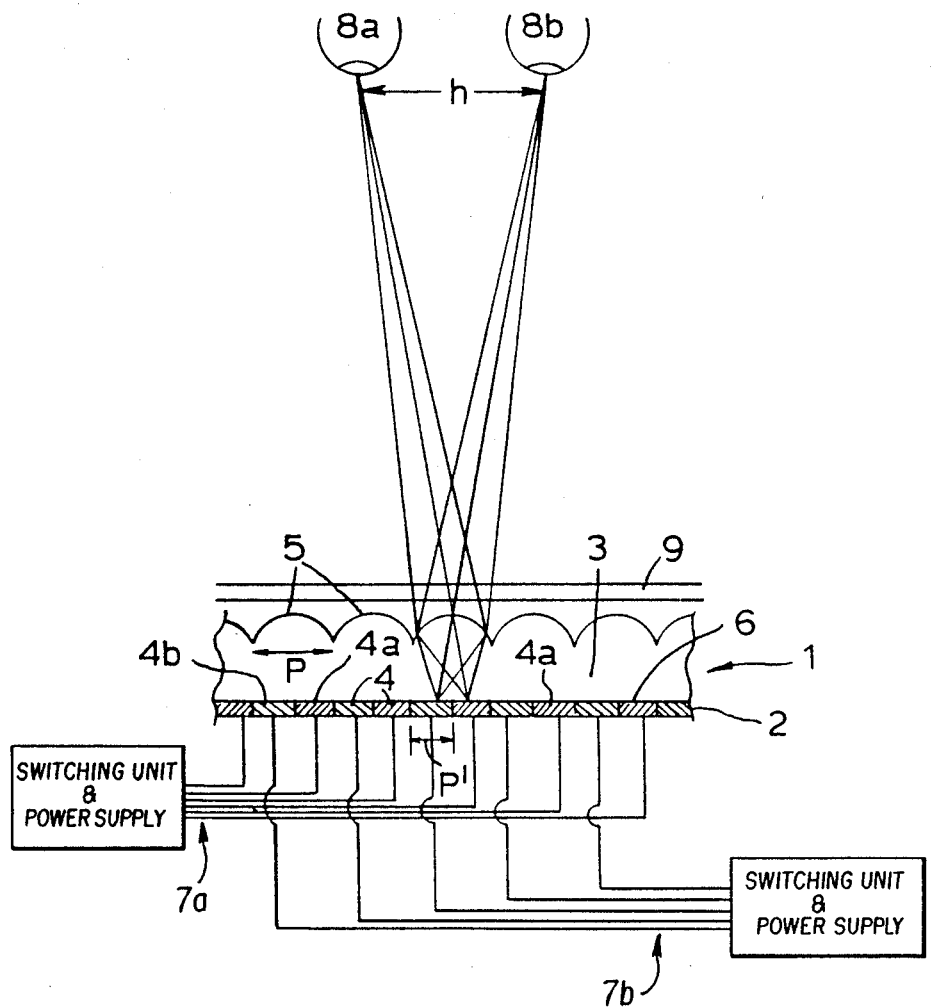
FIG. 1 is a horizontal section through a display means according to the present invention.

Referring to FIG. 1 there is shown a section through a display means (1) comprising an array of light sources (2) and a lenticular screen (3). Both the array of light sources and the lenticular screen extend into and out of the plane of the paper.

The array of light sources (2) is composed of individual elements (4). each of which is individually connected by conductors (7a, 7b) to a switching unit and power supply which are conventional and well known in the art. For the purposes of the present example the light sources (4a, 4b) are considered as being liquid-crystal devices arranged in a two-dimensional array as known in so-called "flat-screen televisions".

The lenticular screen (3) is composed of parallel cylindrical lens elements or lenticles (5). The lenticles each have a curved outer surface, and a flat inner surface (6) which supports the array of light sources (2). The outer surface of each lenticle has a constant radius of curvature. The transverse extent (p') of each of the light sources (4) is equal to half the lenticular pitch (p). A transparent protective screen (9) may be located in front of the lenticular screen (3).

The light sources (4) are divided into two groups (4a) and (4b). At least one member from each group is located below each lenticle (5) as indicated in the figure by the alternating slope of the cross-hatching on the light sources (4a, 4b). The extent of the light sources in the longitudinal direction of the lenticles is preferably of the order of (p') but may be greater or lesser than (p') depending on the actual design of the light sources.

In FIG. 1, the two groups of light sources (4a) and (4b) are wired separately to the switching unit and power supply along respective groups of conductors (7a) and (7b). Considering for the moment only elements (4a) and respective conductors (7a), a composite image made up of individual picture elements may be displayed on the surface (6) when the light sources (4a) are active. The alternate group of light sources (4b) together with the respective conductors (7b) enable the display of a second image interlaced with the first on the same surface (6).

It is particularly preferred that the long axes of the lenticles or the equivalent axes of any alternative light-modifying elements are arranged to lie in a vertical direction when viewed, that is in a direction perpendicular to a line joining the pupils of the observer. Moreover, the order in which the image presented by any one group of light sources (say 4a) is updated is preferably one which is ordered along rather than across the longitudinal axes of the lenticles (5).

When the surface (6) is viewed at a distance through the lenticular screen (3) the separation of the two interlaced images brought about by the lenticles (5) approximates to the spacing (h) between the pupils of the human eye. Consequently, the eyes (8a, 8b) of an observer perceive different images, the image formed by the light sources (4a) being seen by one eye (8a) and the image formed by the light sources (4b) being seen by the other eye (8b). As the images form a pair which differ only in the supposed viewpoint of the observer, the illusion of parallax and 3-dimensionality is effected.

It is envisaged that the display means will be used in conjunction with a microprocessor device capable of addressing a pair of screen memory arrays, each of which arrays corresponds to one or other of the interlaced images.

To provide color images, each light source may be implemented as a unit of three horizontal stripes, one of each of the primary colors. In this case, each stripe will, of course, have an array address which is a sub-set of the array address of the light source itself.

Figure 6:
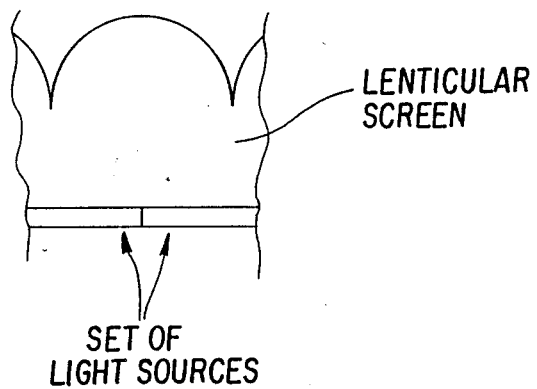
FIG. 6 illustrates a lenticular screen having a single pitch and a single associated set of light sources.

As stated above, the lenticular pitch (p) is equal to twice the transverse extent of each light source. This is entirely satisfactory for relatively small displays. However, for larger displays it is preferable for the transverse extent (p') of each light source to slightly exceed half the lenticular pitch (p). A difference of the order of 1% may be suitable for a display having a width of 0.5 m. FIG. 6 illustrates a single pitch of the lenticular screen and a single associated set of light sources wherein the transverse extent of one set of light sources is greater than the pitch of the cylindrical lens. However, it is important to note that the difference may be minute, for example 1%. For example, with this size display the lenticle pitch may be 0.5 mm and the transverse extent of each light source 0.275 mm. This difference between the pitch (p) and the transverse extent of the light sources (p') compensates for the adverse optical effects which may otherwise occur at the edges of relatively large displays. Similar compensation may be achieved using a non-linear pitch for the lenticles and/or a non-linear transverse extent for the light sources or the spacing therebetween. However, these alternatives tend to create manufacturing difficulties.

It is to be noted that when employing a difference between (p) and (p'). the registration between lenticles and their light sources becomes relative. That is, registration ca not be considered strictly in terms of which light sources lie "behind" which lenticle.

The above description is mainly concerned with arrangements in which the light sources are in the form of hard wired elements. Reference has, however, also been made to the possibility of using discrete phosphor-coated regions. It should be emphasised that it is not possible to implement the present invention by the simple addition of a lenticular screen to a conventional Cathode Ray Tube (CRT) television receiver.

The known monochrome design of CRT has a continuous phosphor-coating on its screen, in contrast to discrete regions of phosphor. Known color CRTs use a shadow mask to define pixels on the screen. Nominally, the shadow mask defines the spot size of the pixels on the screen, but in practice the spread of the electron beam usually exceeds the dot pitch of the shadow mask. Thus, conventionally the spot sized pixels have ill defined edges whereas for use in the present invention well defined discrete pixels are required.

Even if it were possible to incorporate the lenticular screen into the screen of the CRT, maintaining precise registration between the lenticles and the pixels would be exceedingly difficult, due to the high degree of accuracy that would be required from the electron beam deflection circuitry. It is also highly desirable in the present invention to ensure a very high degree of picture stability in the horizontal direction. CRTs do not have good picture stability the width and height of the picture changes by a small amount as the picture brightness alters, therefore the width of picture is hardly ever stable. Also CRTs and associated circuitry do not have a high picture stability over a large temperature range. It is, of course, known to provide discrete groups of phosphor dots on the screen of certain forms of color television receiver. But, the problem of registration with the lenticles of a separate lenticular screen remains. The above problems indicate the difficulty in applying the present invention to CRT type arrangements.

Cathode Ray Tubes rely upon electrons to activate the phosphor. A screen of discrete phosphor-coated regions for use in the present invention could be activated by a laser.

Figure 2:
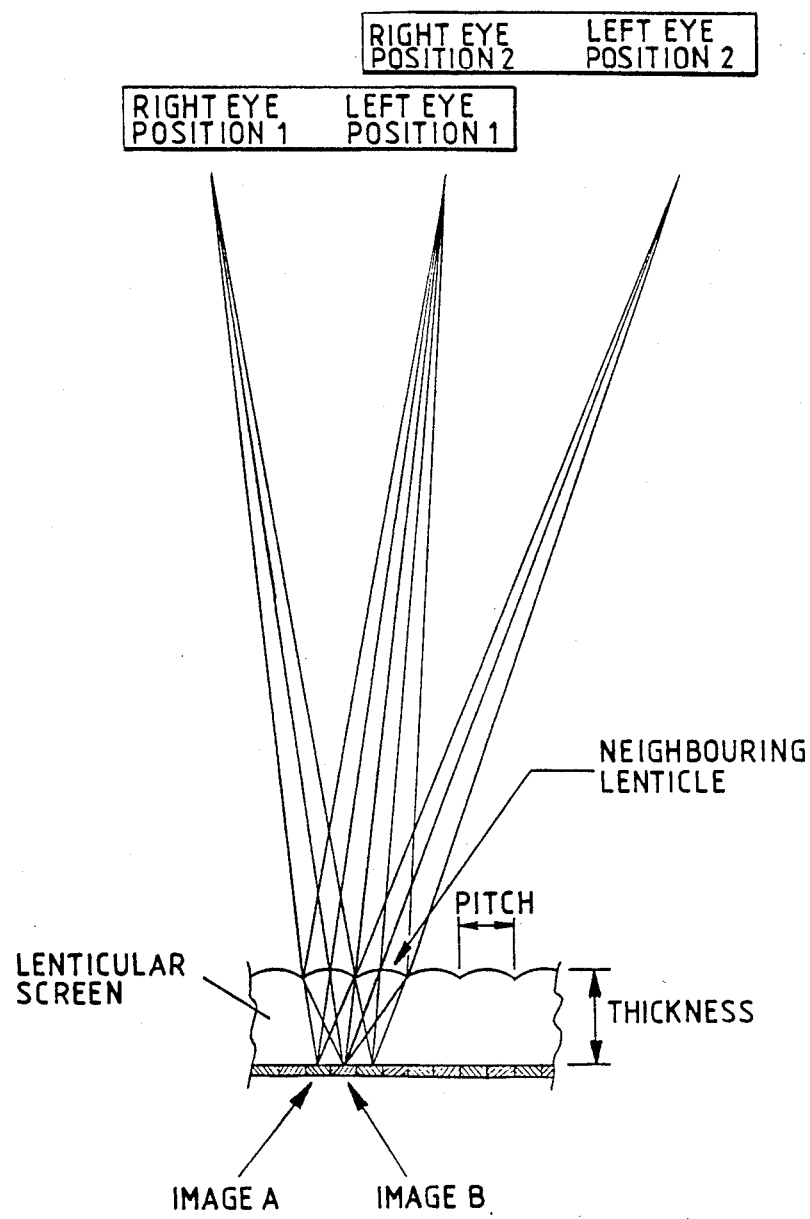
FIG. 2 illustrates a lenticular screen with a relatively small pitch in relation to the depth of the screen.

With the use of a lenticular screen, the applicants have discovered that the viewing angle changes with the depth-to-pitch ratio of the screen. The depth and pitch dimensions are illustrated in FIG. 2. In FIG. 2 the pitch is relatively small with respect to the depth of the screen. FIG. 2 illustrates the effect of the relatively small pitch as an observer moves from a central position, position 1, to a slightly off-center position, position 2. In the off-center position the observer views with his left eye through a neighboring lenticle and observes the incorrect image (image "B") under the original lenticle, and views image "A" through the neighboring lenticle with his right eye. This effect in which a wrong image is viewed by one eye is referred to as the pseudoscopic effect.

The angle between the lines along which the left and right eyes observe the images increases as the viewing distance is reduced. Thus, it is desirable to increase the viewing angle of the display if it is to be used with a reduced viewing distance. The applicants have discovered that the angle at which the pseudoscopic effect occurs can be made larger by increasing the pitch of the lenticles with respect to their depth. This increases the viewing angle of the screen, as shown in FIG. 3.

Figure 3:
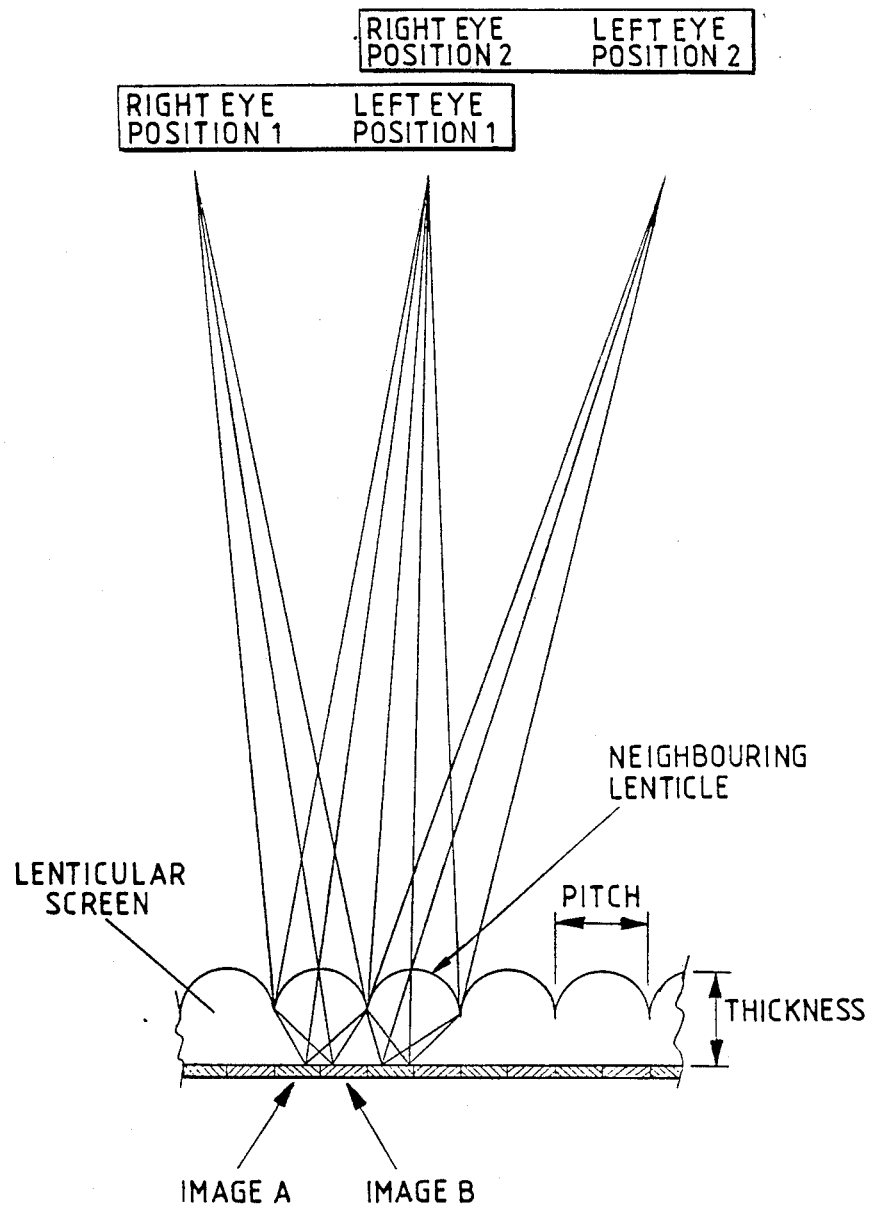
FIG. 3 illustrates a lenticular screen with a relatively large pitch in relation to the depth of the screen.

FIG. 3, also emphasizes the increase in pixel size with pitch. That is, the registration between light sources and lenticles is to be retained regardless of variations in pitch of the lenticles. Thus increasing the pitch of the lenticles provides a greater viewing angle without moving from one pixel to the next.

Figure 4:
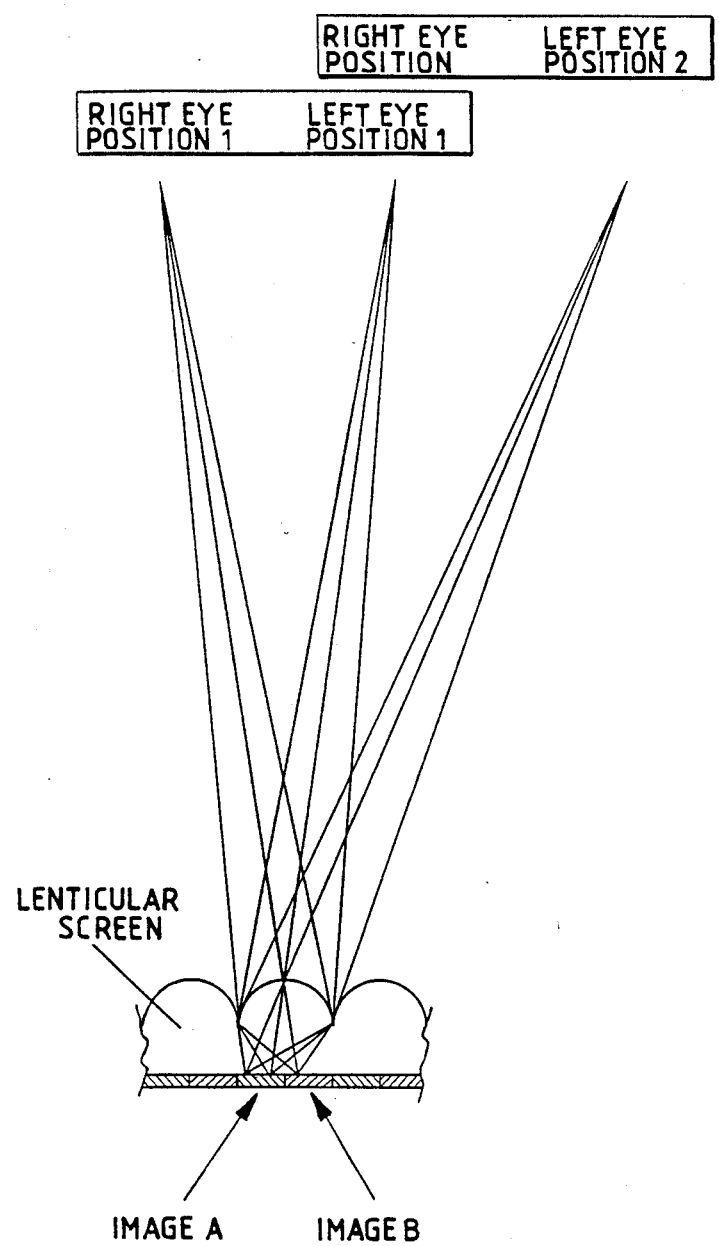
FIG. 4 illustrates the conditions under which a non-stereoscopic image will result.

As well as indicating the increase of viewing angle with pitch, FIG. 3 also illustrates the intermediate stage between a stereoscopic display and onset of the pseudoscopic effect. In FIG. 3, at position 2, the right eye views through the neighboring lenticle image "A", while the left eye views the same image "A" through a neighboring lenticle. But, because of the relatively large pitch of the lenticles the left eye views a "correct" image (image "A"), that is a neighboring pixel from the overall picture. Thus, both eyes view image "A" which results in a two dimensional image being viewed. This can also be seen in FIG. 4, where the same effect arises under different conditions. In position 2 of FIG. 4, the left and right eyes of the observer both view a single light source through the same lenticle. A non-stereoscopic image results.

Figure 5:
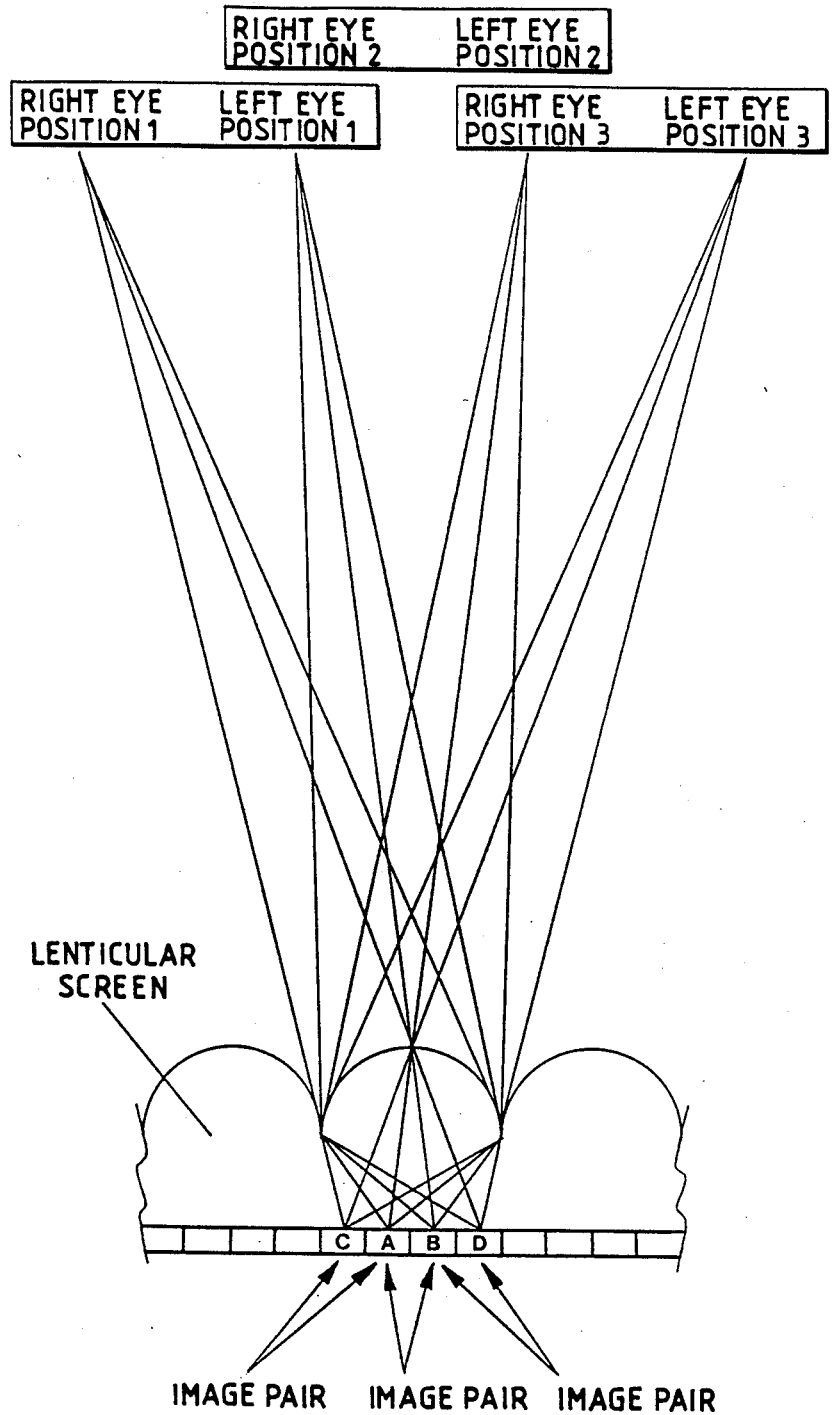
FIG. 5 illustrates a display apparatus in which four light sources are located beneath each lenticle.

The present invention provides a technique for increasing the three dimensional viewing angle of the display. This resides in increasing the number of light sources located beneath each lenticle. The arrangement of FIG. 1 is based upon a set of light sources per lenticle, per row across the display, consisting of two light sources. This is the minimum configuration. It is possible for each set to consist of more than two light sources and an arrangement having four light sources per set is shown in FIG. 5. An uneven number of light sources per set can also be used. In each case, one pair of light sources is viewed by an observer in a first position and another pair of sources is viewed as the observer effectively moves through a small distance to a second position. One light source will be common to both pairs of light sources.

FIG. 5 illustrates the use of a set of four light sources per lenticle. This provides three image pairs per lenticle. With the optimum depth-to-pitch ratio, increasing the number of light sources per set to four can increase the three dimensional viewing angle three-fold. This panoramic effect is indicated in FIG. 5 by the three viewing positions which are shown.

The display device depicted in FIG. 5 and one method of controlling the light sources thereof will now be described. It is to be understood that the following description represents the applicants current understanding of the invention and the validity of the appended claims is not to be determined by any statement of theory contained herein.

FIG. 5 shows three lenticles each having a respective set of four light sources in registration therewith. The light sources are annotated A, B, C and D for the central one of the illustrated lenticles. Lines representing an observer's line of light, from three different positions, are also shown for this central lenticle. It is believed that the lenticle has the effect of masking all but one member of the set of light sources for each eye. In the central viewing position, position 2, the observer's left eye views light source A and the observer's right eye views light source B. Thus, A and B provide the image pair for the central viewing position. If the observer's viewing position moves slightly off center, to position 1 the observer's left eye views light source B and the observer's right eye views light source D. The image pair for position 1 is thus, B and D. Similarly, if the observer's viewing position moves slightly off center in the opposite direction, to position 3, the observer's left eye views light source C and the observer's right eye views light source A. The image pair for positon 3 is thus, A and C. Hence, four light sources per set provide three image pairs and an increased viewing angle can be provided.

To establish a three dimensional panoramic effect the image must appear to an observer to move across the screen as the observer's viewing position moves transversely with respect to the screen. A method of determining which light sources should be activated to achieve this effect will now be described. It is believed that this method is effective because of certain physiological reactions of the human brain. In particular, it is believed that the human brain tends to sum separate neighboring images as viewed by the left and right eyes. This summation is believed to exist at a single level, that is having summed two neighboring pixels, each seen only by a respective eye of the observer the resultant is not further summed with any other such resultants.

In FIG. 5 consider the light sources under the left hand lenticle to be designated C1, A1, B1 and D1, respectively, from the left hand extreme. Similarly, consider the light sources under the right hand lenticle to be designated C3, A3, B3 and D3 respectively, from the left hand extreme of that lenticle. Also, consider the central light sources as being A2, B2, C2, D2— rather than just the A, B, C, D as illustrated.

From position 2, the observer will "see" a single "dot" if light sources A1 and B2 are activated. This "dot" will appear to be at the boundary between the left and central lenticles, at a distance corresponding to the lenticle pitch in front of the light source array. If light source D3 is also activated the effect of the observer moving to position 1 will be that the "dot" appears to move to the boundary between the central and right lenticles, again at a distance corresponding to the lenticle pitch in front of the light source array. That is, as the observer moves to the right, the "dot" appears to move to the left.

In position 2, the observer's brain appears to sum images A1 and B2 and in position 1 the observer's brain appears to sum images B2 and D3. These image pairs (A1, B2 and B2, D3) ar in accordance with the image pairs (A, B and B, D) explained above with reference to the lines of sight shown in FIG. 5. One member of each pair (A1, D3) is from a neighboring set because the resultant is required to be one pitch length in front of the light source array. In position 2 with only light sources A1 and B3 activated, the observer would "see" a "dot" in front of the central lenticle at a distance corresponding to twice the lenticular pitch from the light source array.

It will be apparent from the above that the number of lenticles involved in the production of a single "dot" depends on the desired position of the "dot" with respect to the plane of the array. Assuming that correct viewing from each of positions 1, 2 and 3 is required: if the "dot" is to be in the plane of the array, all four light sources associated with one lenticle must be activated; if the "dot" is to be one pitch length displaced from the array, a different light source from each of four neighboring lenticle sets must be activated (e.g. the image pairs for position 1, 2, 3 are D4B3, B3A2 and A2C1, respectively from four neighboring lenticles). It is to be noted that displacement of a "dot" behind the array is obtained just as readily as displacement in front of the array. (That is, the image pairs for positions 1, 2 and 3 become D1B2, B2A3 and A3C4 respectively).

Thus, if one knows where each "dot" of the final three dimensional picture is required, the light sources which need to be activated to produce each "dot" can be determined. This task can readily be achieved by a suitably programmed conventional computer. The input to the computer may, for example, be the images in digital form from two cameras viewing the same object from slightly different positions. Hence, the display device of the present invention can be used in a television receiver where the received broadcast signal is in the form of several digital images. (One digital image should be provided for each light source per set. That is, in the four pixel arrangement, four separate digital images should preferably be provided. These images could be different views as seen by a single camera or could be provided by respective cameras.) Subsequent processing of the broadcast signals occurs in the television receiver. The broadcasting of a digital television image (a single or "one camera" view of a scene) has already been successfully achieved. Alternatively, of course, the fully processed data could be transmitted, for example, on a cable distribution type network.

Applications of the present invention include its us in advertising, in leisure industries and in education.

What we claim is:

1. A stereoscopic display means comprising:
   a display surface;
   a plurality of discrete light sources arranged on the display surface in sets, at least two light sources being arranged in a set;
   means for independently controlling each light source; and
   a light-transmissive lenticular screen having two or more lenticles, said screen being disposed in fixed relation to the surface so as to enable the formation of a three dimensional image, each set of light sources being adapted and arranged in registration with a respective lenticle for the display of a pair of interlaced images and said three dimensional image comprising a pair of spaced apart images having parallax therebetween.

2. Display means as claimed in claim 1, wherein the lenticles comprise cylindrical lenses and are disposed in a parallel configuration.

3. Display means as claimed in claim 2, wherein each set of light sources is disposed in the focal plane of each cylindrical lens.

4. Display means as claimed in claim 1, wherein each set comprises four light sources.

5. Display means as claimed in claim 1, wherein each set of light sources has a transverse extent and each cylindrical lens has a common pitch, the transverse extent of each set being greater than the pitch of the cylindrical lens.

6. Display means as claimed in claim 1, wherein the light sources comprise illuminated liquid crystal elements.

7. Display means as claimed in claim 1, wherein the light sources comprise visible light emitting diodes.

8. Display means as claimed in claim 1, wherein the light sources comprises gas plasma elements.

9. Display means as claimed in claim 1, wherein the light sources comprise phosphor-coated regions of the surface.

10. Display means as claimed in claim 1, wherein the means for independently controlling the light sources includes a power supply, a switching unit and respective conductors which are electrically connected to each light source.

* * * * *